(12) United States Patent
Mayya et al.

(10) Patent No.: US 10,778,528 B2
(45) Date of Patent: Sep. 15, 2020

(54) METHOD AND SYSTEM OF CONNECTING TO A MULTIPATH HUB IN A CLUSTER

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Nitin Kumar Ananda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/707,124

(22) Filed: Sep. 18, 2017

(65) Prior Publication Data

US 2018/0234300 A1    Aug. 16, 2018

Related U.S. Application Data

(60) Provisional application No. 62/523,477, filed on Jun. 22, 2017, provisional application No. 62/457,816, filed on Feb. 11, 2017.

(51) Int. Cl.
*H04L 12/24*    (2006.01)
*H04L 12/46*    (2006.01)
(Continued)

(52) U.S. Cl.
CPC .......... *H04L 41/12* (2013.01); *H04L 12/4633* (2013.01); *H04L 41/0803* (2013.01);
(Continued)

(58) Field of Classification Search
CPC . H04L 41/12; H04L 43/0811; H04L 12/4633; H04L 43/0876; H04L 41/0803;
(Continued)

(56) References Cited

U.S. PATENT DOCUMENTS 6,154,465 A    11/2000 Pickett
6,445,682 B1    9/2002 Weitz
(Continued)

FOREIGN PATENT DOCUMENTS

EP    1912381 A1    4/2008
EP    3041178 A1    7/2016
(Continued)

OTHER PUBLICATIONS

Petition for Post-Grant Review of U.S. Pat. No. 9,722,815, filed May 1, 2018, 106 pages.

(Continued)

*Primary Examiner* — Ivan O Latorre
(74) *Attorney, Agent, or Firm* — Adeli LLP (57) ABSTRACT

In one aspect, a computerized method useful for connecting to a multipath hub in a cluster includes the step of, with a gateway in a same network as the cluster, receiving, from a branch edge, a request to connect to a logical identifier (ID) of the multipath hub. The gateway recognizes a logical ID representing a cluster. The gateway determines a least-loaded edge in the cluster to be the multipath hub. The gateway returns a connectivity information for the multipath hub. The branch edge configures a tunnel to the multipath hub.

20 Claims, 9 Drawing Sheets

(51) Int. Cl.
*H04L 12/26* (2006.01)
*H04L 29/06* (2006.01)
*H04L 12/803* (2013.01)

(52) U.S. Cl.
CPC ...... *H04L 43/0811* (2013.01); *H04L 43/0876* (2013.01); *H04L 47/125* (2013.01); *H04L 63/029* (2013.01); *H04L 63/0272* (2013.01)

(58) Field of Classification Search
CPC .. H04L 47/125; H04L 63/029; H04L 63/0272
IPC ........................................ H04L 41/12
See application file for complete search history.

(56) References Cited

U.S. PATENT DOCUMENTS

| | | | |
|---|---|---|---|
| 7,003,481 | B2 | 2/2006 | Banka et al. |
| 7,320,017 | B1 | 1/2008 | Kurapati et al. |
| 7,680,925 | B2 | 3/2010 | Sathyanarayana et al. |
| 7,962,458 | B2 | 6/2011 | Holenstein et al. |
| 8,111,692 | B2 | 2/2012 | Ray |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,566,452 | B1 | 10/2013 | Goodwin, III et al. |
| 8,724,456 | B1 | 5/2014 | Hong et al. |
| 8,964,548 | B1 | 2/2015 | Keralapura et al. |
| 9,055,000 | B1 | 6/2015 | Ghosh et al. |
| 9,071,607 | B2 | 6/2015 | Twitchell, Jr. |
| 9,075,771 | B1 | 7/2015 | Gawali et al. |
| 9,154,327 | B1 | 10/2015 | Marino et al. |
| 9,306,949 | B1 | 4/2016 | Richard et al. |
| 9,336,040 | B2 | 5/2016 | Dong et al. |
| 9,354,983 | B1 | 5/2016 | Yenamandra et al. |
| 9,432,245 | B1* | 8/2016 | Sorenson, III ........ H04L 47/125 |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,525,564 | B2 | 12/2016 | Lee |
| 9,608,962 | B1 | 3/2017 | Chang |
| 9,665,432 | B2 | 5/2017 | Kruse et al. |
| 9,686,127 | B2 | 6/2017 | Ramachandran et al. |
| 9,715,401 | B2 | 7/2017 | Devine et al. |
| 9,722,815 | B2 | 8/2017 | Mukundan et al. |
| 9,787,559 | B1 | 10/2017 | Schroeder |
| 9,825,822 | B1 | 11/2017 | Holland |
| 9,906,401 | B1 | 2/2018 | Rao |
| 10,057,183 | B2 | 8/2018 | Salle et al. |
| 10,135,789 | B2 | 11/2018 | Mayya et al. |
| 10,178,032 | B1 | 1/2019 | Freitas |
| 10,187,289 | B1* | 1/2019 | Chen ...................... H04L 12/66 |
| 10,229,017 | B1 | 3/2019 | Zou et al. |
| 10,237,123 | B2 | 3/2019 | Dubey et al. |
| 10,320,664 | B2 | 6/2019 | Nainar et al. |
| 10,326,830 | B1* | 6/2019 | Singh ................. H04L 67/1004 |
| 10,348,767 | B1 | 7/2019 | Lee et al. |
| 2002/0198840 | A1 | 12/2002 | Banka et al. |
| 2003/0088697 | A1 | 5/2003 | Matsuhira |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0224771 | A1 | 11/2004 | Chen et al. |
| 2005/0078690 | A1 | 4/2005 | DeLangis |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0193247 | A1 | 8/2006 | Naseh et al. |
| 2007/0064604 | A1 | 3/2007 | Chen et al. |
| 2007/0091794 | A1 | 4/2007 | Filsfils et al. |
| 2007/0121486 | A1 | 5/2007 | Guichard et al. |
| 2007/0177511 | A1 | 8/2007 | Das et al. |
| 2007/0260746 | A1 | 11/2007 | Mirtorabi et al. |
| 2008/0049621 | A1 | 2/2008 | McGuire et al. |
| 2008/0080509 | A1 | 4/2008 | Khanna et al. |
| 2008/0095187 | A1 | 4/2008 | Jung et al. |
| 2008/0219276 | A1 | 9/2008 | Shah et al. |
| 2009/0125617 | A1 | 5/2009 | Klessig et al. |
| 2009/0154463 | A1 | 6/2009 | Hines et al. |
| 2009/0247204 | A1 | 10/2009 | Sennett et al. |
| 2010/0008361 | A1 | 1/2010 | Guichard et al. |
| 2010/0088440 | A1 | 4/2010 | Banks et al. |
| 2010/0118727 | A1 | 5/2010 | Draves et al. |
| 2010/0191884 | A1 | 7/2010 | Holenstein et al. |
| 2010/0332657 | A1* | 12/2010 | Elyashev ............ H04L 67/1002 709/226 |
| 2011/0040814 | A1 | 2/2011 | Higgins |
| 2011/0075674 | A1 | 3/2011 | Li et al. |
| 2011/0110370 | A1 | 5/2011 | Moreno et al. |
| 2011/0153909 | A1 | 6/2011 | Dong |
| 2012/0008630 | A1 | 1/2012 | Ould-Brahim |
| 2012/0027013 | A1* | 2/2012 | Napierala ............... H04L 45/04 370/390 |
| 2012/0157068 | A1 | 6/2012 | Eichen et al. |
| 2012/0173919 | A1 | 7/2012 | Patel et al. |
| 2012/0221955 | A1 | 8/2012 | Raleigh et al. |
| 2012/0250682 | A1 | 10/2012 | Vincent et al. |
| 2012/0250686 | A1 | 10/2012 | Vincent et al. |
| 2012/0300615 | A1 | 11/2012 | Kempf et al. |
| 2012/0317291 | A1 | 12/2012 | Wolfe |
| 2013/0019005 | A1 | 1/2013 | Hui et al. |
| 2013/0021968 | A1 | 1/2013 | Reznik et al. |
| 2013/0044764 | A1* | 2/2013 | Casado .................. H04L 12/66 370/401 |
| 2013/0051399 | A1* | 2/2013 | Zhang .................. H04L 47/12 370/401 |
| 2013/0103834 | A1 | 4/2013 | Dzerve et al. |
| 2013/0124718 | A1 | 5/2013 | Griffith et al. |
| 2013/0124911 | A1 | 5/2013 | Griffith et al. |
| 2013/0124912 | A1 | 5/2013 | Griffith et al. |
| 2013/0128889 | A1 | 5/2013 | Mathur et al. |
| 2013/0142201 | A1 | 6/2013 | Kim et al. |
| 2013/0173788 | A1 | 7/2013 | Song |
| 2013/0182712 | A1 | 7/2013 | Aguayo et al. |
| 2013/0238782 | A1 | 9/2013 | Zhao et al. |
| 2013/0242718 | A1 | 9/2013 | Zhang |
| 2013/0254599 | A1 | 9/2013 | Katkar et al. |
| 2013/0258839 | A1 | 10/2013 | Wang et al. |
| 2013/0283364 | A1 | 10/2013 | Chang et al. |
| 2013/0301642 | A1 | 11/2013 | Radhakrishnan et al. |
| 2013/0329548 | A1 | 12/2013 | Nakil et al. |
| 2014/0019604 | A1 | 1/2014 | Twitchell, Jr. |
| 2014/0092907 | A1 | 4/2014 | Sridhar et al. |
| 2014/0108665 | A1 | 4/2014 | Arora et al. |
| 2014/0112171 | A1 | 4/2014 | Pasdar |
| 2014/0156818 | A1 | 6/2014 | Hunt |
| 2014/0156823 | A1 | 6/2014 | Liu et al. |
| 2014/0173113 | A1 | 6/2014 | Vemuri et al. |
| 2014/0173331 | A1 | 6/2014 | Martin et al. |
| 2014/0219135 | A1 | 8/2014 | Li et al. |
| 2014/0223507 | A1 | 8/2014 | Xu |
| 2014/0244851 | A1 | 8/2014 | Lee |
| 2014/0258535 | A1 | 9/2014 | Zhang |
| 2014/0317440 | A1 | 10/2014 | Biermayr et al. |
| 2014/0341109 | A1 | 11/2014 | Cartmell et al. |
| 2015/0016249 | A1 | 1/2015 | Mukundan et al. |
| 2015/0029864 | A1 | 1/2015 | Raileanu et al. |
| 2015/0046572 | A1 | 2/2015 | Cheng et al. |
| 2015/0052247 | A1 | 2/2015 | Threefoot et al. |
| 2015/0088942 | A1 | 3/2015 | Shah |
| 2015/0089628 | A1 | 3/2015 | Lang |
| 2015/0092603 | A1 | 4/2015 | Aguayo et al. |
| 2015/0096011 | A1 | 4/2015 | Watt |
| 2015/0146539 | A1 | 5/2015 | Mehta et al. |
| 2015/0172121 | A1 | 6/2015 | Farkas et al. |
| 2015/0188823 | A1* | 7/2015 | Williams ............. H04L 47/125 370/235 |
| 2015/0201036 | A1 | 7/2015 | Nishiki et al. |
| 2015/0222543 | A1 | 8/2015 | Song |
| 2015/0236962 | A1 | 8/2015 | Veres et al. |

(56) References Cited

U.S. PATENT DOCUMENTS

| | | |
|---|---|---|
| 2015/0271104 A1 | 9/2015 | Chikkamath et al. |
| 2015/0334696 A1 | 11/2015 | Gu et al. |
| 2015/0350907 A1* | 12/2015 | Timariu ............ H04W 52/0219 |
| | | 726/6 |
| 2015/0363733 A1 | 12/2015 | Brown |
| 2015/0372943 A1 | 12/2015 | Hasan et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0072669 A1 | 3/2016 | Saavedra |
| 2016/0105471 A1 | 4/2016 | Nunes et al. |
| 2016/0134528 A1 | 5/2016 | Lin et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0255169 A1 | 9/2016 | Kovvuri et al. |
| 2016/0315912 A1 | 10/2016 | Mayya et al. |
| 2016/0352588 A1 | 12/2016 | Subbarayan et al. |
| 2016/0359738 A1 | 12/2016 | Sullenberger et al. |
| 2016/0380886 A1 | 12/2016 | Blair et al. |
| 2017/0012870 A1 | 1/2017 | Blair et al. |
| 2017/0026283 A1 | 1/2017 | Williams et al. |
| 2017/0034129 A1 | 2/2017 | Sawant et al. |
| 2017/0053258 A1* | 2/2017 | Carney ................... H04L 43/08 |
| 2017/0055131 A1* | 2/2017 | Kong ..................... H04W 4/027 |
| 2017/0064005 A1 | 3/2017 | Lee |
| 2017/0093625 A1 | 3/2017 | Pera et al. |
| 2017/0118173 A1 | 4/2017 | Arramreddy et al. |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0163473 A1 | 6/2017 | Sadana et al. |
| 2017/0181210 A1 | 6/2017 | Nadella et al. |
| 2017/0195169 A1 | 7/2017 | Mills et al. |
| 2017/0201585 A1* | 7/2017 | Doraiswamy ....... H04L 41/0806 |
| 2017/0207976 A1 | 7/2017 | Rovner et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0310641 A1 | 10/2017 | Jiang et al. |
| 2017/0310691 A1* | 10/2017 | Vasseur ............... H04L 63/1425 |
| 2017/0317974 A1* | 11/2017 | Masurekar ............ H04L 69/22 |
| 2017/0337086 A1 | 11/2017 | Zhu et al. |
| 2017/0339070 A1 | 11/2017 | Chang et al. |
| 2017/0364419 A1 | 12/2017 | Lo |
| 2018/0007123 A1 | 1/2018 | Cheng et al. |
| 2018/0014051 A1 | 1/2018 | Phillips et al. |
| 2018/0034668 A1 | 2/2018 | Mayya et al. |
| 2018/0041425 A1* | 2/2018 | Zhang .................... H04L 45/02 |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0084081 A1 | 3/2018 | Kuchibhotla et al. |
| 2018/0131720 A1 | 5/2018 | Hobson et al. |
| 2018/0145899 A1 | 5/2018 | Rao |
| 2018/0167378 A1 | 6/2018 | Kostyukov et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0260125 A1 | 9/2018 | Botes et al. |
| 2018/0270104 A1 | 9/2018 | Zheng et al. |
| 2018/0278541 A1* | 9/2018 | Wu ....................... H04W 24/08 |
| 2018/0295529 A1 | 10/2018 | Jen et al. |
| 2018/0302286 A1 | 10/2018 | Mayya et al. |
| 2018/0351855 A1 | 12/2018 | Sood et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2019/0028552 A1 | 1/2019 | Johnson et al. |
| 2019/0046056 A1 | 2/2019 | Khachaturian et al. |
| 2019/0058709 A1 | 2/2019 | Kempf et al. |
| 2019/0068470 A1 | 2/2019 | Mirsky |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0313907 A1 | 10/2019 | Khachaturian et al. |

FOREIGN PATENT DOCUMENTS

| | | |
|---|---|---|
| WO | 2012167184 A2 | 12/2012 |
| WO | 2017083975 A1 | 5/2017 |
| WO | 2019070611 A1 | 4/2019 |
| WO | 2019094522 A1 | 5/2019 |

OTHER PUBLICATIONS

Non-Published commonly Owned U.S. Appl. No. 15/701,115, filed Sep. 11, 2017, 21 pages, Nicira, Inc.

Non-Published commonly Owned U.S. Appl. No. 15/784,404, filed Oct. 16, 2017, 21 pages, Nicira, Inc.

Non-Published commonly Owned U.S. Appl. No. 15/811,329, filed Nov. 13, 2017, 37 pages, Nicira, Inc.

Non-Published commonly Owned U.S. Appl. No. 15/838,052, filed Dec. 11, 2017, 28 pages, Nicira, Inc.

Non-Published commonly Owned U.S. Appl. No. 15/838,355, filed Dec. 11, 2017, 29 pages, Nicira, Inc.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

\* cited by examiner

METHOD AND SYSTEM OF CONNECTING TO A MULTIPATH HUB IN A CLUSTER

CROSS-REFERENCE TO RELATED APPLICATIONS

This application claims priority to U.S. Provisional Application No. 62/457,816, titled METHOD AND SYSTEM OF OVERLAY FLOW CONTROL, filed on 11 Feb. 2017. This provisional application is incorporated by reference in its entirety. This application claims priority to U.S. Provisional Application No. 62/523,477, titled METHOD AND SYSTEM OF RESILIENCY AND VISIBILITY IN CLOUD-DELIVERED SD-WAN, filed on 22 Jun. 2017. This provisional application is incorporated by reference in its entirety.

FIELD OF THE INVENTION

This application relates generally to computer networking, and more specifically to a system, article of manufacture and method connecting to a hub in a cluster.

DESCRIPTION OF THE RELATED ART

Inherently, the size of a single VPN Network with a Hub may be constrained by the scale of the individual Hub. For large customers whose deployments reach twenty-thousand (20,000) sites, it may neither practical to scale an individual appliance to meet this scale nor mandate the customer manage individual separate Hubs to achieve this. In order to address this limitation, a clustering functionality can be used to easily expand the capacity of the Hub dynamically by creating a logical cluster, while also providing resiliency via the Active/Active HA topology that a cluster of Edges would provide. The Nodes in a Cluster can be either physical or virtual Edges. If they are virtual, they may exist on a single hypervisor or across hypervisors. The Edges within the cluster may communicate with the Gateway for control plane information and do not directly communicate nor exchange state.

BRIEF SUMMARY OF THE INVENTION

In one aspect, a computerized method useful for connecting to a multipath hub in a cluster includes the step of, with a gateway in a same network as the cluster, receiving, from a branch edge, a request to connect to a logical identifier (ID) of the multipath hub. The gateway recognizes a logical ID representing a cluster. The gateway determines a least-loaded edge in the cluster to be the multipath hub. The gateway returns a connectivity information for the multipath hub. The branch edge configures a tunnel to the multipath hub.

The Figures described above are a representative set, and are not exhaustive with respect to embodying the invention.

DESCRIPTION

Disclosed are a system, method, and article of manufacture for connecting to a multipath hub in a cluster. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this cation to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Border Gateway Protocol (BGP) can be a standardized exterior gateway protocol designed to exchange routing and reachability information among autonomous systems (AS) on the Internet.

Dynamic tunneling can refer to MultiPath tunnels (i.e. paths) that are established on-demand between two endpoints when there is VPN traffic to be sent between two Edges, and torn down after VPN traffic is completed.

Edge device can be a device that provides an entry point into enterprise or service provider core networks. An edge device can be software running in a virtual machine (VM) located in a branch office and/or customer premises.

Enterprise Data Center can include multiple data centers (e.g. each with a duty of sustaining key functions).

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Inter-process communication (IPC) can include mechanisms an operating system provides to allow the processes to manage shared data. Typically, applications can use IPC, categorized as clients and servers, where the client requests data and the server responds to client requests.

Orchestrator can include a software component that provides multi-tenant and role based centralized configuration management and visibility.

Subnet can be a logical subdivision of an IP network.

Tunneling protocol can allow a network user to access or provide a network service that the underlying network does not support or provide directly.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Additional example definitions are provided herein.

Examples Systems and Processes

A variety of techniques can be used to maintain branch connectivity to data centers, cloud applications, etc. For example, in a data center topology, an edge device (e.g. an edge) can be deployed in two different ways. As a cluster, redundancy can be provided for a single data center leveraging multiple independent devices. Alternately, redundancy can be provided by deploying multiple physical edges in multiple data centers that are interconnected via routing external to a gateway. In the clustering topology, each edge in a cluster can report health statistics to a gateway at a specified period (e.g. every 30 seconds etc.). This can enable it to make intelligent decisions about assignment and re-balancing.

Figure 1:
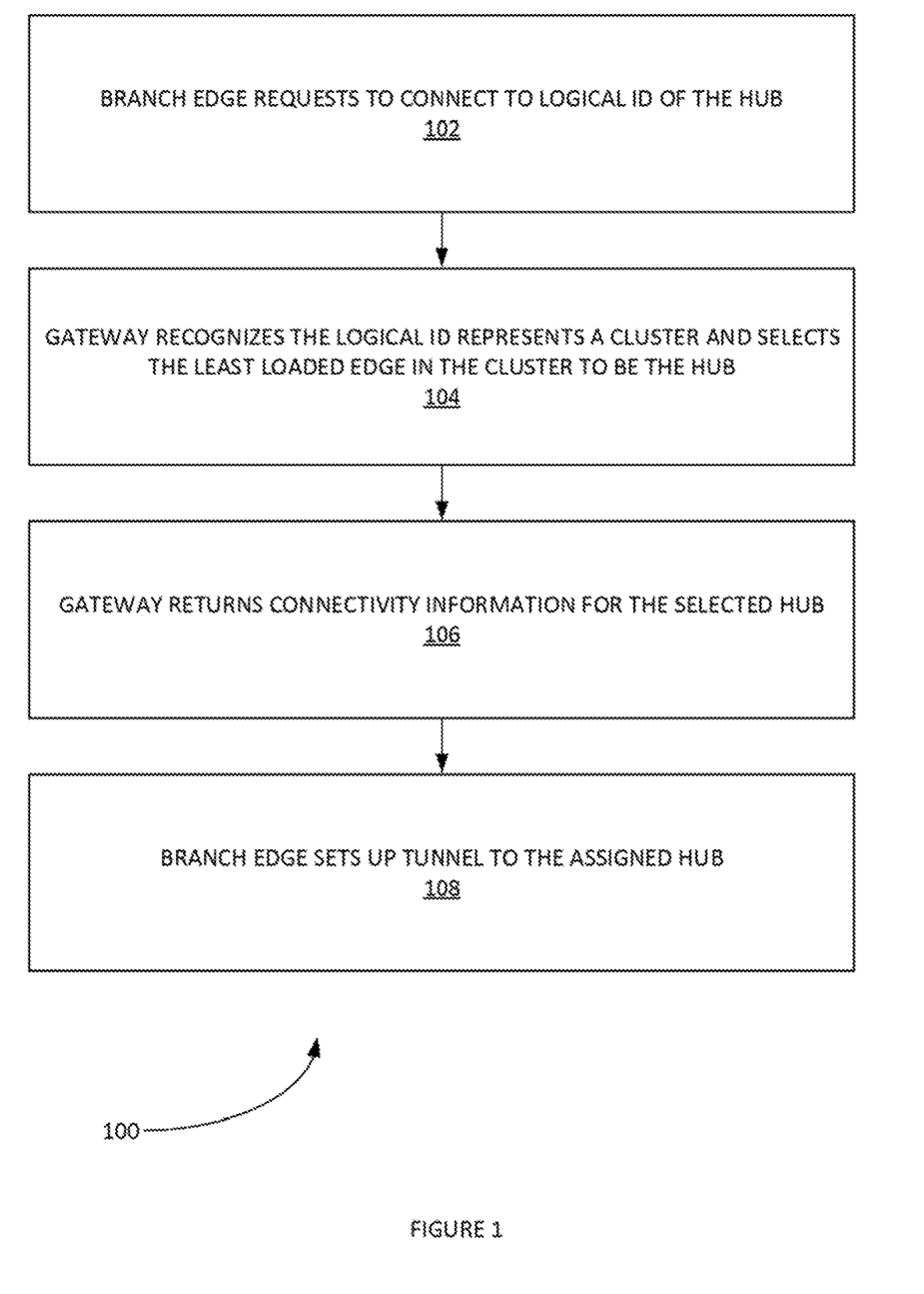
FIG. 1 illustrates an example process for connecting to a hub in a cluster, according to some embodiments.

FIG. 1 illustrates an example process 100 for connecting to a multipath hub in a cluster, according to some embodiments. In step 102, a branch edge can request to connect to logical identifier (ID) of the multipath hub (e.g. a node with a large number of links, etc.). In step 104, the gateway recognizes the logical ID represents a cluster and selects the least loaded edge the cluster to be the multipath hub. In step 106, the gateway returns connectivity information for the selected multipath hub. In step 108, the branch edge sets up tunnel to the assigned multipath hub. Each measure of utilization is treated as a max out of one-hundred percent (100%). The tunnel count can be a maximum value based on the model number of the hardware model itself. The three (3) utilization percentages can be averaged to arrive at an integer number of utilization. The Edge with the lowest utilization number can be selected as the multipath hub. In case of a tie in lowest utilization score, a first Edge in the list with that score (e.g. the Edge which has been connected to the gateway the longest) can be selected. For example, on an Edge 1000: CPU 20%, Memory 30%, Tunnels 200 (out of 2000 max) Utilization score: (20+30+(20/2000))/3=20.

Figure 2:
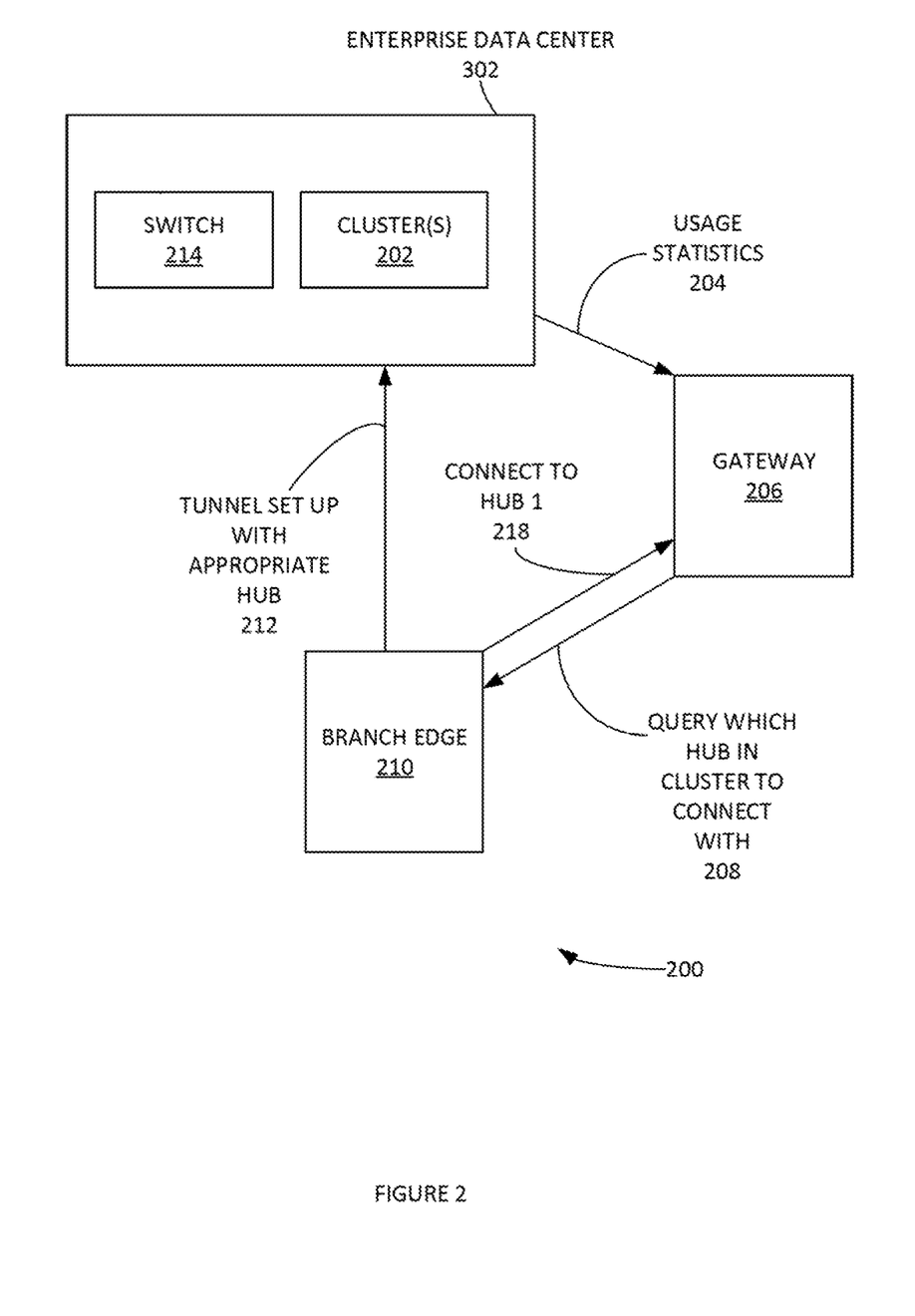
FIG. 2 illustrates a system for implementing process 100, according to some embodiments.
Figure 3:
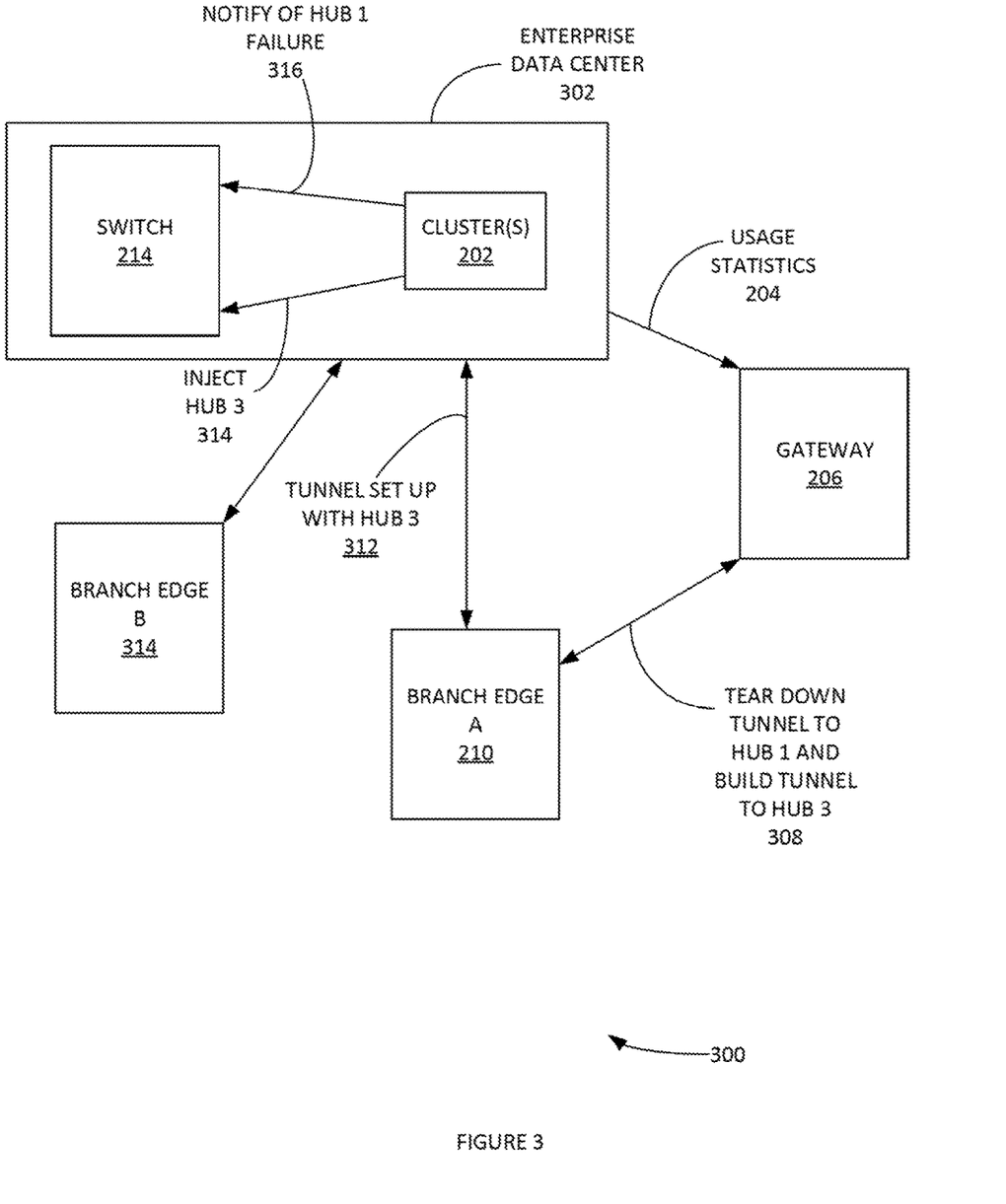
FIG. 3 illustrates an example when a Branch Edge loses connectivity to a Hub of an Enterprise Data Center, according to some embodiments.

FIGS. 2 and 3 illustrate systems 200 and 300 for implementing process 100, according to some embodiments. Cluster(s) 202 can include various multipath hubs (e.g. Hubs 1-4 502-508 of FIG. 5, etc.). Cluster(s) 202 can communicate various network usage statistics 204 to cluster 206. Cluster(s) 202 can operate in an Enterprise Data Center 302. Branch Edge 210 can communicate a query which hub in cluster to connect with to cluster 206. Cluster 206 can communicate a specific hub identifier to Branch Edge 210 in step 214. Based on this information, branch edge 210 can set up a tunnel with appropriate hub in step 212. Switch 214 can be an L3 switch. Layer 3 switching can be based on (e.g. destination) IP address stored in the header of IP datagram.

FIG. 3 illustrates an example when a Branch Edge 210 loses connectivity to a multipath Hub of an Enterprise Data Center, according to some embodiments. For example, all tunnels/paths connecting the Edge to the Hub disconnect and the Edge loses all means of connectivity to the Hub. It can again send a connection request to a gateway with the logical ID of Gateway 206, as if it were connecting for the first time. Since the gateway also has a list of connected hubs, if there was truly an outage, it may have also gone dead to the gateway and have been deleted from the list of available Edges that can be assigned from Gateway 206.

Even though in this use case Branch Edge(s) 210 and 314 may be connected to different Hubs in Gateway 206. Gateway 206 can signal the creation of Dynamic Edge-to-Edge tunnels in case both Branch Edge(s) 210 and 314 are not connected to the same Hub in Gateway 206. Gateway 206 can include a controller (not shown) that functions as a control plane piece of the Gateway 206.

Figure 4:
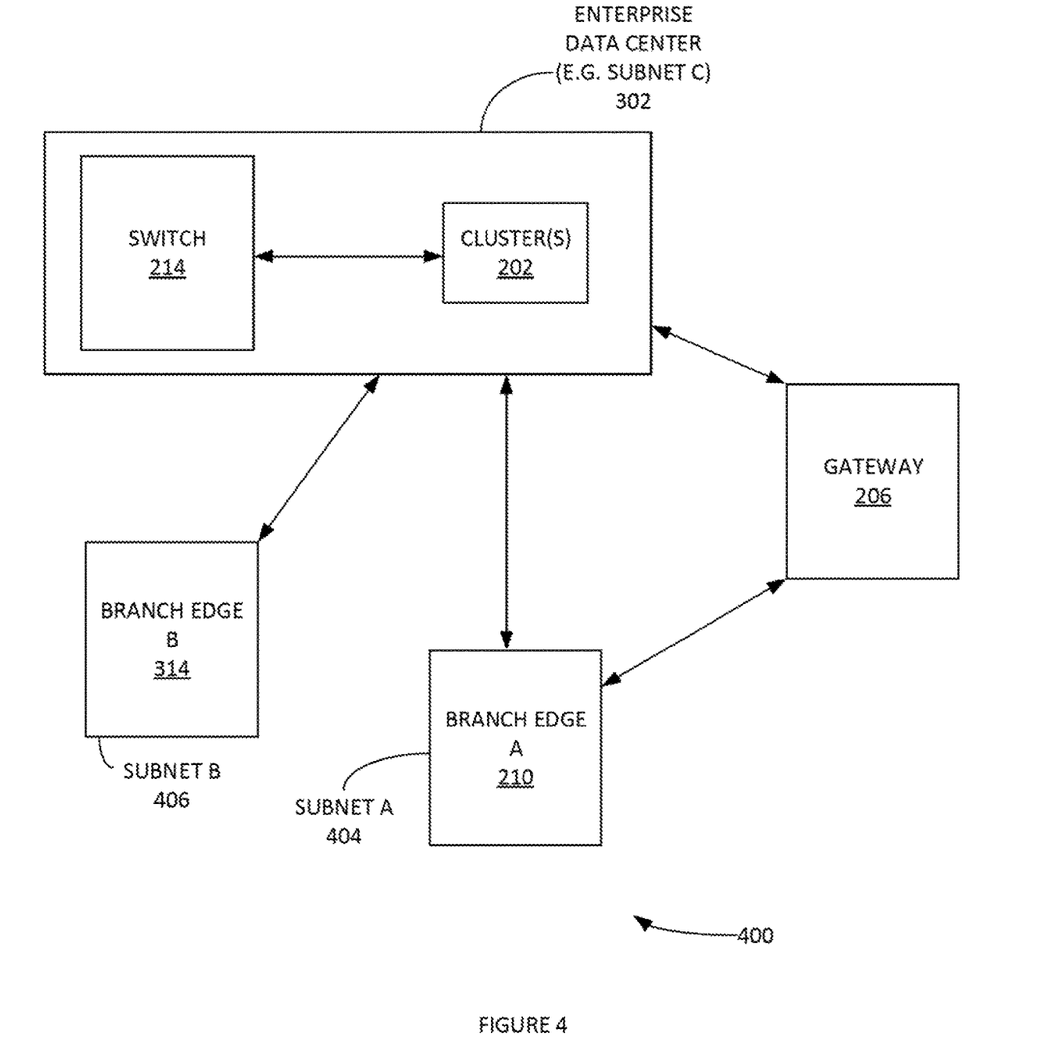
FIG. 4 where an Edge A sends traffic from Subnet A to Subnet B, according to some embodiments.

FIG. 4 where an Edge A 210 sends traffic from Subnet A 404 to Subnet B 406, according to some embodiments. Edge A 210 can send traffic from Subnet A 404 to Subnet B 406, Hub1 has learned the route for Edge B 314 from the L3 Switch 214 and advertised to Edge A 210 via a routing protocol (e.g. Velocloud® routing protocol (VCRP), etc.), Edge1 sends the traffic to Hub1. Edge1 can notify the gateway that it has initiated a connection to an IP in B. Traffic for B can be forwarded to the L3 Switch 214. L3 Switch 214 routes traffic to Hub3 as switch 214 has learned that route from Hub3 via a dynamic routing protocol (e.g. OSPF, BGP, etc.). Hub3 sends the traffic to Edge B 314 where it has learned the route for Edge B 314 via a routing protocol. Upon receipt of the message sent in process 100 supra, the gateway determines that Edge A 210 and Edge B 314 can directly connect. The gateway can notify Edge A 210 about connectivity information of Edge B 314. Gateway notifies Edge B 314 about connectivity information of Edge A 210. A dynamic tunnel can be established between Edge A 210 and Edge B 314. Traffic is moved to the direct tunnel and no longer traverses Cluster 206. It is noted that Cluster(s) 202 can operate in an Enterprise Data Center 302 (e.g. Subnet C).

Figure 5:
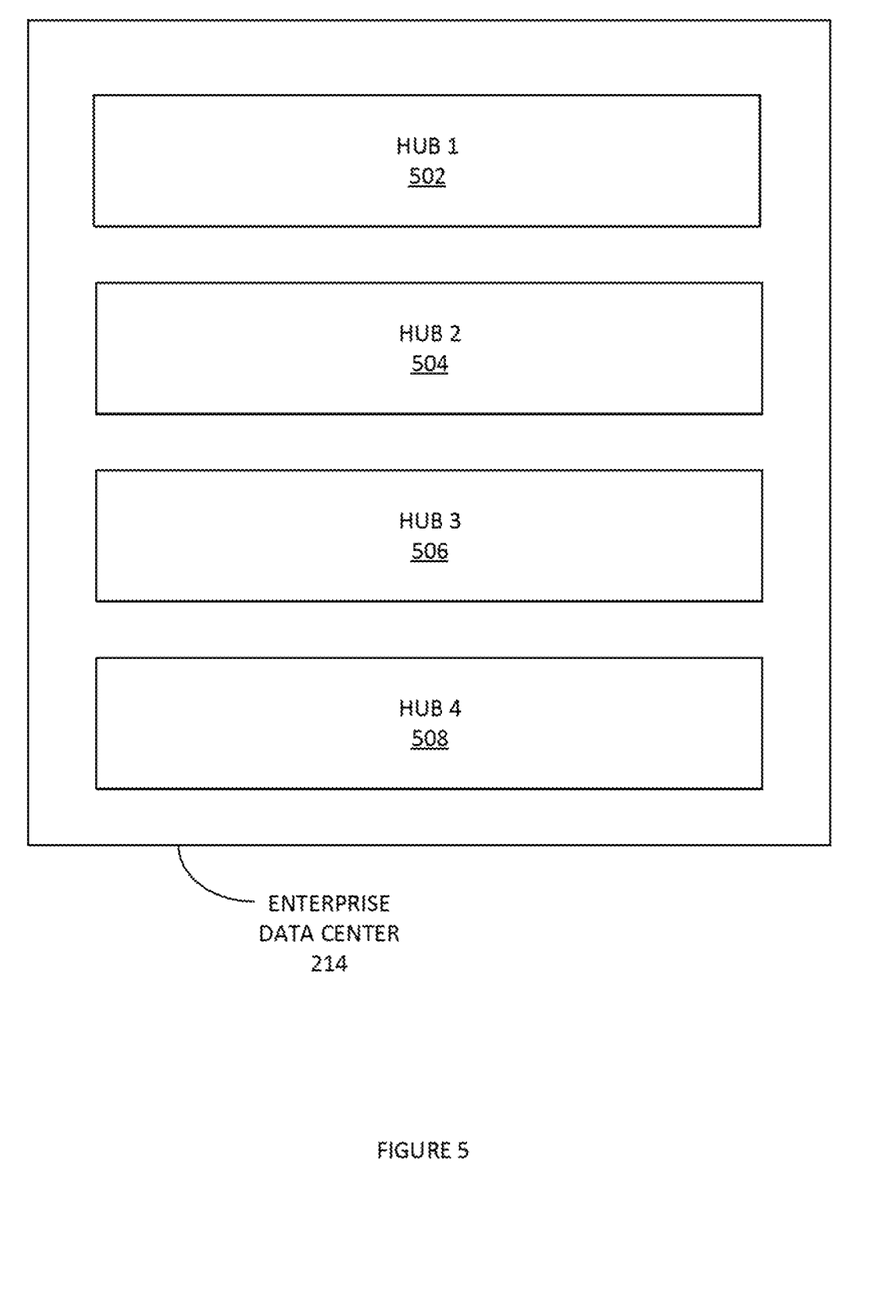
FIG. 5 illustrates an example enterprise data center, according to some embodiments.

FIG. 5 illustrates an example enterprise data center, according to some embodiments. By way of example, Enterprise data center 202 can include one or more Hubs 1-4 502-508.

Figure 6:
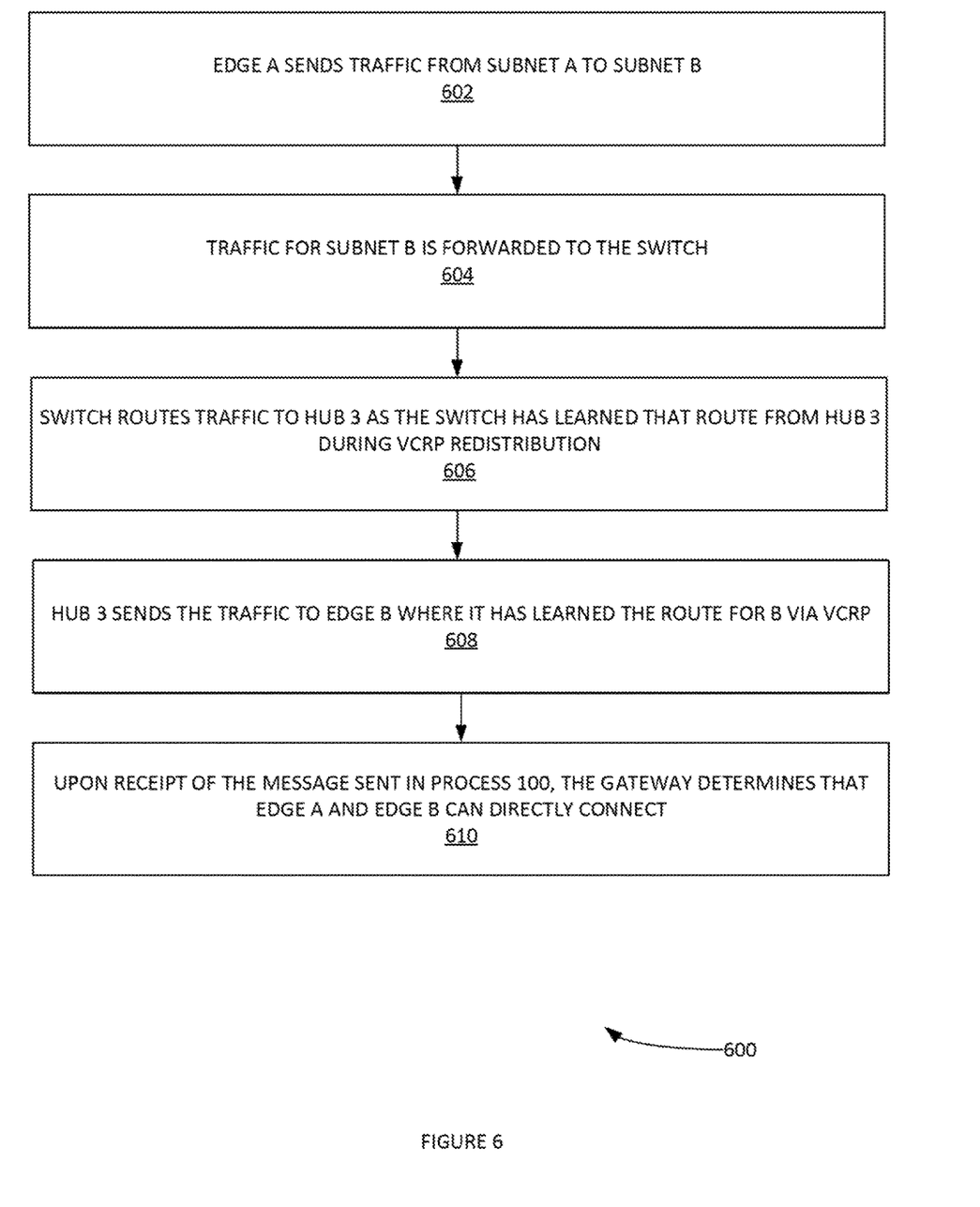
FIG. 6 illustrates an example process for connecting when an edge loses connectivity to a hub, according to some embodiments.

FIG. 6 illustrates an example process 600 for connecting when an edge loses connectivity to a hub, according to some embodiments. Process 600 can be implement with system 400 of FIG. 4 and system 500 of FIG. 5. For example, in step 602, Edge A 210 sends traffic from Subnet A 404 to Subnet B 406.

Figure 7:
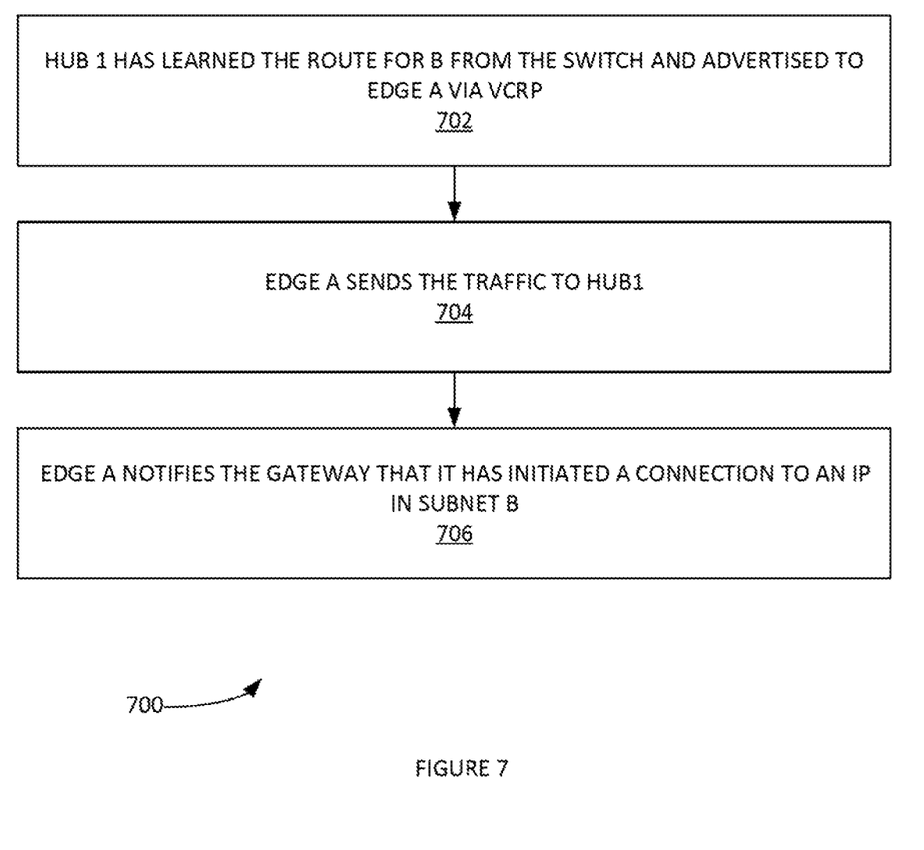
FIG. 7 illustrates an example process of implementing aspects of step 602 or process 600, according to some embodiments.

FIG. 7 illustrates an example process 700 of implementing aspects of step 602 or process 600, according to some embodiments. In step 702, Hub 1 502 has learned the route for Edge B 314 from the switch and advertised to Edge A 210 via a routing protocol. In step 704, Edge A 210 sends the traffic to Hub1 502. In step 706, Edge A 210 notifies the gateway that it has initiated a connection to an IP in Subnet B 406.

Returning to process 600, in step 604, traffic for Subnet B 406 is forwarded to the Switch 214. In step 606, the switch routes traffic to Hub 3 506 as the switch has learned that route from Hub 3 506 via a dynamic routing protocol (e.g. OSPF, BGP, etc.). In step 608, Hub 3 506 sends the traffic to Edge B where it has learned the route for B via a routing protocol.

Figure 8:
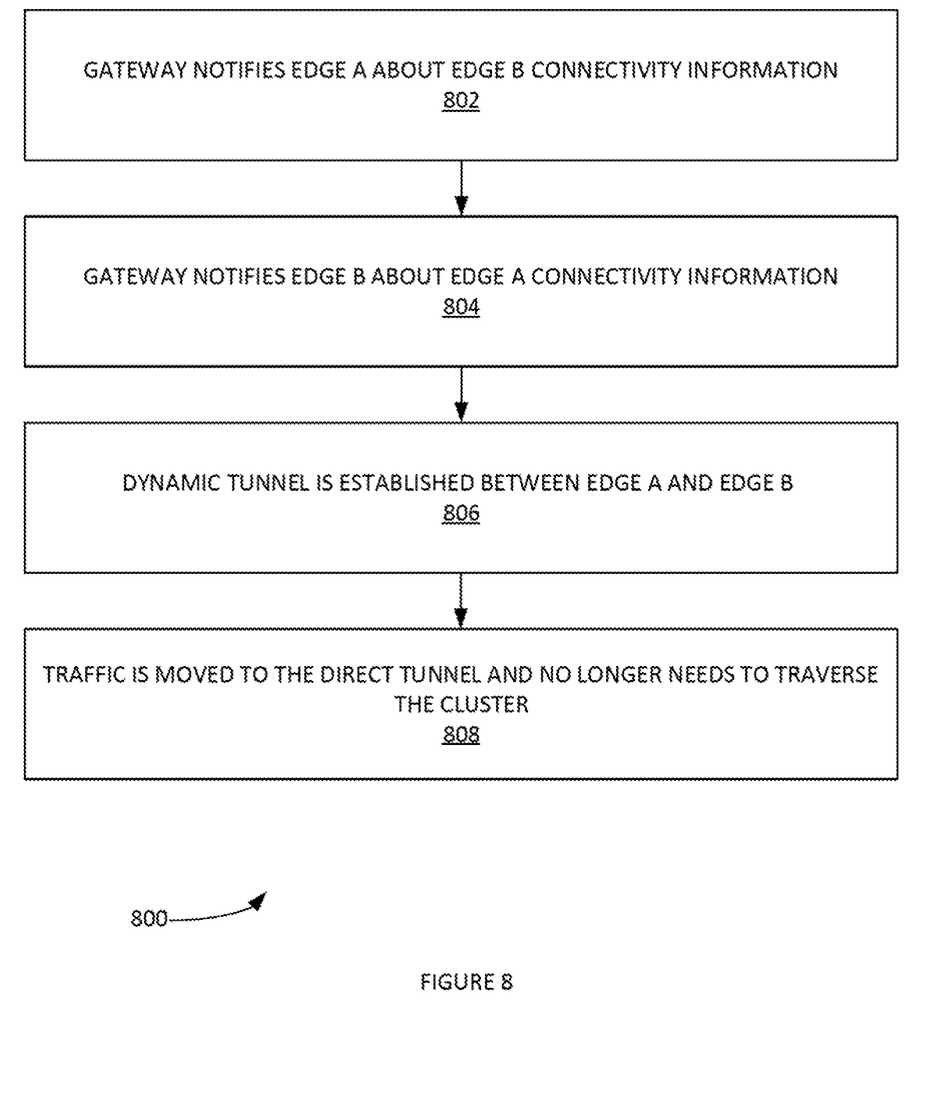
FIG. 8 illustrates an example process for implementing aspects of step 610 and/or process 600, according to some embodiments.

In step 610, upon receipt of the message sent in process 100, the gateway determines that Edge A 210 and Edge B 314 can directly connect. Edge A 210 and Edge B 314 are then connected. FIG. 8 illustrates an example process 800 for implementing aspects of step 610 and/or process 600, according to some embodiments. In step 802, a gateway notifies Edge A 210 about Edge B 314 connectivity information. In step 804, the gateway notifies Edge B 314 about the connectivity information of Edge A 210. In step 806, a dynamic tunnel is established between edge a and Edge B 314. In step 808, traffic is moved to the direct tunnel and no longer needs to traverse cluster 206.

Figure 9:
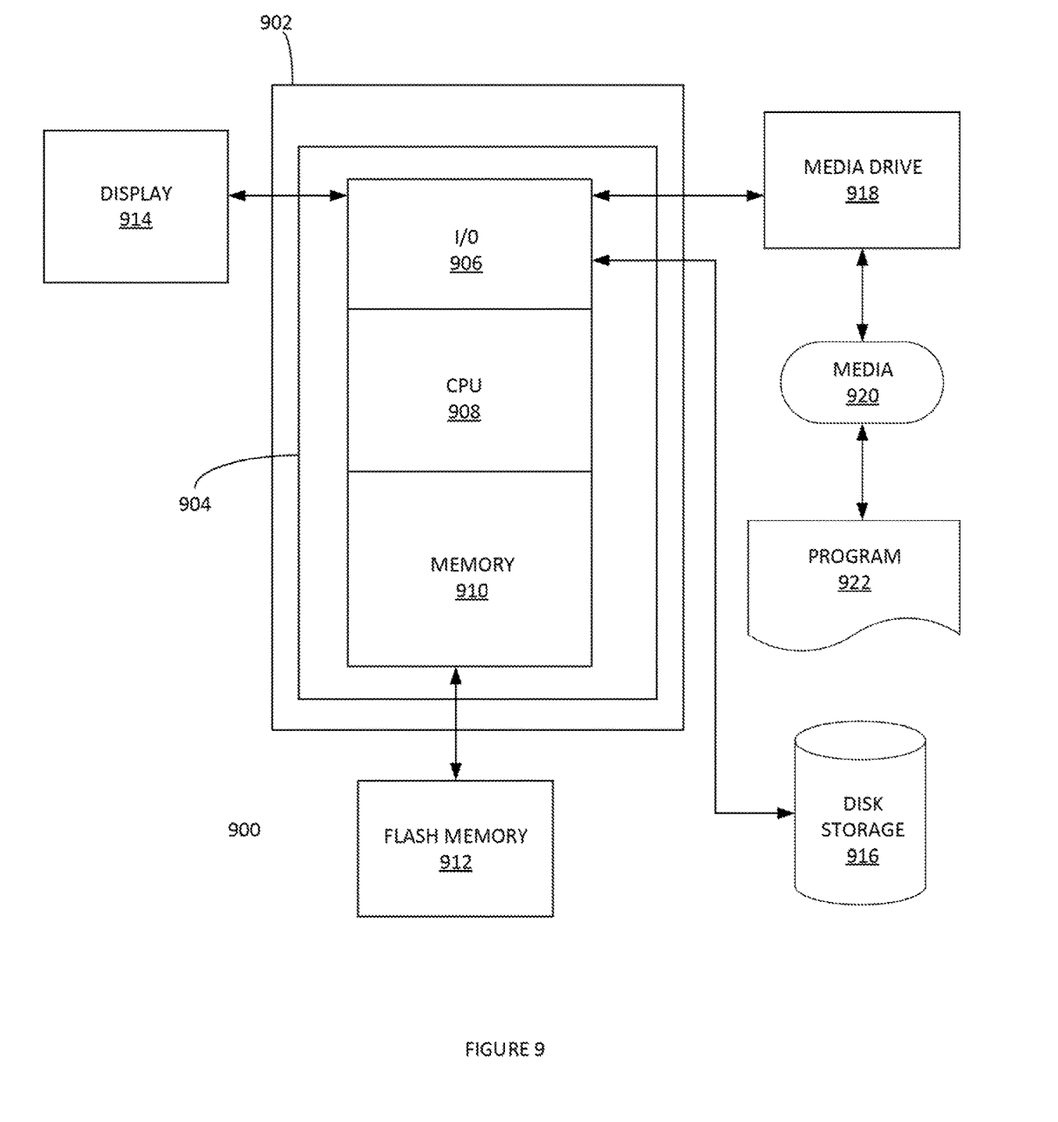
FIG. 9 depicts an exemplary computing system that can be configured to perform any one of the processes provided herein.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for connecting an edge device of a branch network to a multipath hub in an enterprise datacenter, the method comprising:
at an access node for a cluster comprising a plurality of multipath hubs in the enterprise datacenter:
receiving, from the edge device of the branch network, a connection request to connect to the multipath hub cluster;
identifying a logical identifier in the connection request as an identifier representing the cluster;
selecting a particular multipath hub of the cluster to serve as a hub for traffic to and from the branch network; and
returning to the edge device a set of connectivity data identifying the particular multipath hub,
wherein the edge device uses the connectivity data to establish a tunnel between the edge device in the branch network and the particular multipath hub in the enterprise datacenter.

2. The method of claim 1, wherein selecting the particular multipath hub comprises selecting a least-loaded available multipath hub in the cluster to be a multipath hub for the branch network.

3. The method of claim 2, wherein:
selecting the least-loaded multipath hub comprises selecting an available multipath hub with a lowest edge utilization number; and
each available multipath hub has an edge utilization number computed based on at least one of a tunnel usage count percentage, a CPU usage percentage, and a memory usage percentage of the multipath hub.

4. The method of claim 3, wherein a maximum value for the tunnel usage count percentage of a multipath hub is based on a model number of a hardware model of the multipath hub.

5. The method of claim 1, wherein the edge device is a first edge device, the branch network is a first branch network, and the particular multipath hub is a first multipath hub, the method further comprising:

at the access node:
receiving, from a second edge device of a second branch network, another connection request to connect to the multipath hub cluster;
identifying a logical identifier in the other connection request as an identifier representing the cluster;
selecting a second multipath hub of the cluster to serve as a hub for traffic to and from the second branch network; and
returning to the second edge device a set of connectivity data identifying the second multipath hub;
wherein the second edge device uses the connectivity data to configure a tunnel between the second edge device in the second branch network and the second multipath hub in the enterprise datacenter.

6. The method of claim 5, wherein when the first multipath hub determines that a data message received from the first edge device should be forwarded to the second branch network, the first multipath hub forwards the data message to the second multipath hub and the second multipath hub forwards the data message to the second edge device of the second branch network.

7. The method of claim 6, wherein forwarding the data message from the first multipath hub to the second multipath hub comprises forwarding the data message from the first multipath hub to a physical forwarding element in the enterprise datacenter, wherein the physical forwarding element forwards the data message to the second multipath hub.

8. The method of claim 5, wherein the first branch network is a first subnet of a third network and the second branch network is a second subnet of the third network.

9. The method of claim 8, wherein the enterprise datacenter comprises a third subnet of the third network.

10. The method of claim 5 further comprising:
at the access node:
determining that the first edge device and the second edge device should connect directly;
sending to the first edge device a set of connectivity data identifying the second edge device; and
sending to the second edge device a set of connectivity data identifying the first edge device,
wherein the first and second edge devices use the sets of connectivity data identifying the first and second edge devices to establish a direct tunnel between the first edge device and the second edge device, wherein traffic between the first branch network and the second branch network is transmitted through the direct tunnel.

11. The method of claim 1, wherein the enterprise datacenter comprises a plurality of physical datacenters.

12. The method of claim 1, wherein the access node is a gateway to which both the edge device and the enterprise datacenter connect.

13. A non-transitory machine readable medium storing a program that, when executed by a set of processing units of a gateway device, connects an edge device of a branch network to a multipath hub in an enterprise datacenter, the program comprising sets of instructions for:
at an access node for a cluster comprising a plurality of multipath hubs in an enterprise datacenter:
receiving, from the edge device of the branch network, a connection request to connect to the multipath hub cluster;
identifying a logical identifier in the connection request as an identifier representing the cluster;
selecting a particular multipath hub of the cluster to serve as a hub for traffic to and from the branch network; and
returning to the edge device a set of connectivity data identifying the particular multipath hub;
wherein the edge device uses the connectivity data to establish a tunnel between the edge device in the branch network and the particular multipath hub in the enterprise datacenter.

14. The non-transitory machine readable medium of claim 13, wherein the sets of instructions for selecting the particular multipath hub comprise sets of instructions for selecting a least-loaded available multipath hub in the cluster to be a multipath hub for the branch network.

15. The non-transitory machine readable medium of claim 14, wherein:
the sets of instructions for selecting the least-loaded multipath hub comprise sets of instructions for selecting an available multipath hub with a lowest edge utilization number; and
each available multipath hub has an edge utilization number computed based on at least one of a tunnel usage count percentage, a CPU usage percentage, and a memory usage percentage of the multipath hub.

16. The non-transitory machine readable medium of claim 15, wherein a maximum value for the tunnel usage count percentage of a multipath hub is based on a model number of a hardware model of the multipath hub.

17. The non-transitory machine readable medium of claim 13, wherein the edge device is a first edge device, the branch network is a first branch network, and the particular multipath hub is a first multipath hub, the program further comprising sets of instructions for:
at the access node:
receiving, from a second edge device of a second branch network, another connection request to connect to the multipath hub cluster;
identifying a logical identifier in the other connection request as an identifier representing the cluster;
selecting a second multipath hub of the cluster to serve as a hub for traffic to and from the second branch network; and
returning to the second edge device a set of connectivity data identifying the second multipath hub;
wherein the second edge device uses the connectivity data to configure a tunnel between the second edge device in the second branch network and the second multipath hub in the enterprise datacenter.

18. The non-transitory machine readable medium of claim 17, wherein when the first multipath hub determines that a data message received from the first edge device should be forwarded to the second branch network, the first multipath hub forwards the data message to the second multipath hub and the second multipath hub forwards the data message to the second edge device of the second branch network.

19. The non-transitory machine readable medium of claim 17, the program further comprising sets of instructions for:
at the access node:
determining that the first edge device and the second edge device should connect directly;
sending to the first edge device a set of connectivity data identifying the second edge device; and
sending to the second edge device a set of connectivity data identifying the first edge device,
wherein the first and second edge devices use the sets of connectivity data identifying the first and second edge devices to establish a direct tunnel between the first edge device and the second edge device, wherein traffic between the first branch network and the second branch network is transmitted through the direct tunnel.

20. The non-transitory machine readable medium of claim 13, wherein the enterprise datacenter comprises a plurality of physical datacenters.

* * * * *